G. W. HOFMANN AND W. R. MURAY.
YIELDING UPPER BEARING FOR CENTRIFUGAL SEPARATORS.
APPLICATION FILED NOV. 18, 1916. RENEWED MAR. 1, 1920.
1,353,958.
Patented Sept. 28, 1920.
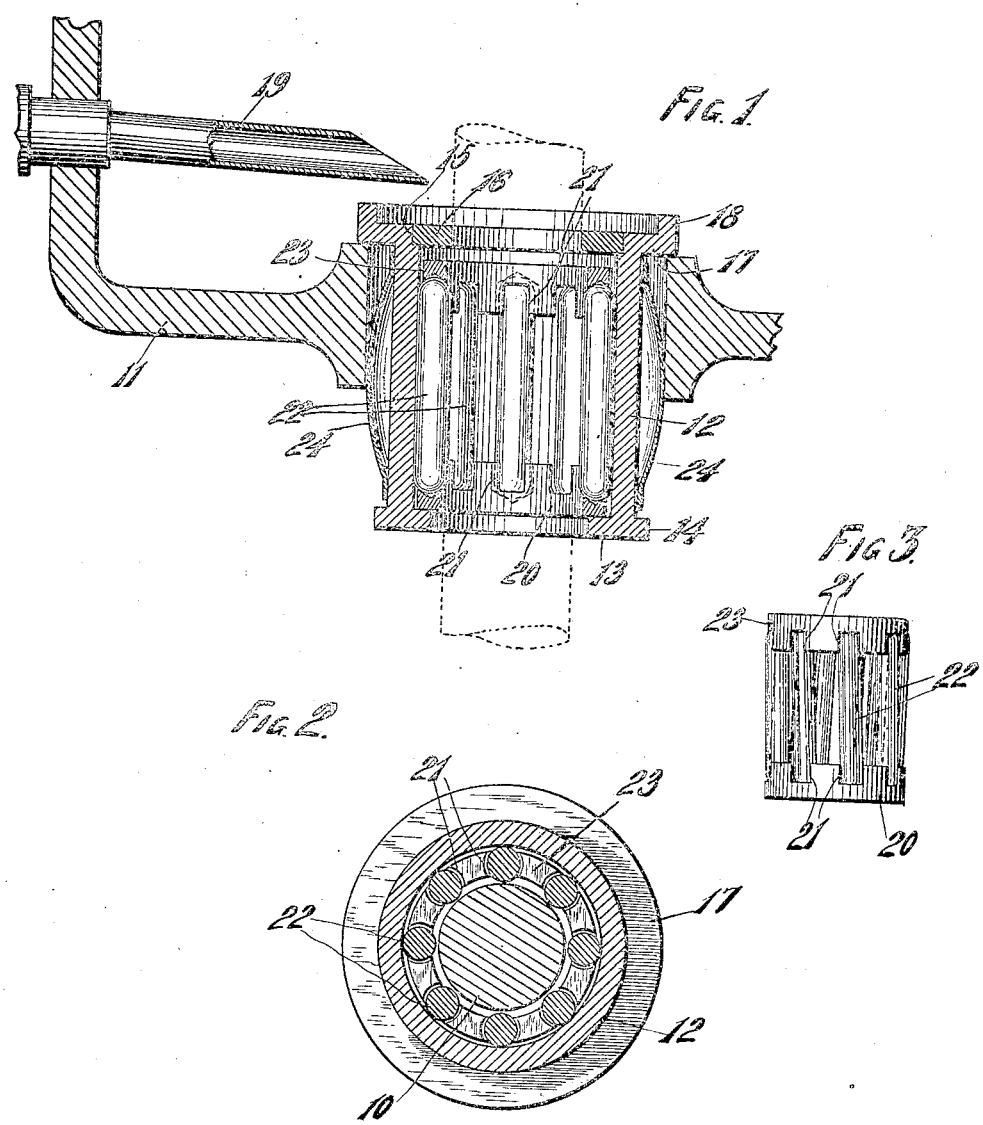

UNITED STATES PATENT OFFICE.

GEORGE W. HOFMANN AND WILLIAM R. MURAY, OF MILWAUKEE, WISCONSIN, ASSIGNORS TO STANDARD SEPARATOR COMPANY, OF MILWAUKEE, WISCONSIN, A CORPORATION OF NEW JERSEY.

YIELDING UPPER BEARING FOR CENTRIFUGAL SEPARATORS.

1,353,958. Specification of Letters Patent. Patented Sept. 28, 1920.

Application filed November 18, 1916, Serial No. 132,026. Renewed March 1, 1920. Serial No. 362,550.

*To all whom it may concern:*

Be it known that we, GEORGE W. HOFMANN, a citizen of the United States, and resident of Milwaukee, in the county of Milwaukee and State of Wisconsin, and WILLIAM R. MURAY, a subject of the Emperor of Japan, and resident of Milwaukee, in the county of Milwaukee and State of Wisconsin, have invented new and useful Improvements in Yielding Upper Bearings for Centrifugal Separators, of which the following is a description, reference being had to the accompanying drawings, which are a part of this specification.

This invention has for its object to provide a yielding upper bearing for centrifugal separators which will readily permit of the oscillation and gyration of the separating bowl supporting spindle with the least amount of friction.

With the above and other objects in view the invention consists in the yielding upper bearing for centrifugal separators as herein claimed and all equivalents.

Referring to the accompanying drawings, in which like characters of reference indicate the same parts in the different views, Figure 1 is a vertical sectional view of a yielding bearing for centrifugal separators constructed in accordance with this invention;

Fig. 2 is a transverse sectional view thereof; and

Fig. 3 is a detail view of the rollers and their spacing rings.

In these drawings 10 indicates a bowl supporting spindle of a centrifugal separator which is provided as usual with a driving connection and an end thrust bearing at its lower end, not shown. The spindle passes through an opening in the frame or casing 11 as usual, where it is surrounded by a cylindrical tubular sleeve 12 which is provided at its lower end with an internal flange 13 and an external flange 14. At its upper end it is provided with an internal shouldered recess 15 within which is tightly fitted a retaining ring 16 and an external flange 17 resting on the casing with an upturned rim 18 to form an oil reservoir into which lubricating oil is dropped from an oil feed tube 19 passing through the casing.

Within the sleeve 12 and resting on the internal flange 13 thereof is a spacer ring 20 of somewhat larger internal diameter than the diameter of the spindle and of somewhat smaller external diameter than the internal diameter of the sleeve and provided with regularly spaced vertical sockets 21 in its upper part, each socket being larger in diameter than the thickness of the spacer ring with a conically shaped lower end forming a lubricant pocket. A series of vertical rollers 22 with spherically rounded ends loosely fit in the sockets of the spacer ring 20 and have the corresponding sockets of a similar but inverted spacer ring 23 loosely fitting on their upper ends, the upper spacer ring 23 being thus supported solely by the upstanding rollers and being confined against displacement therefrom by the retaining ring 16 to permit a limited vertical movement of the spacer ring and the entire assembly of the roller cage within the sleeve 12. The rollers 22 are of such diameter that they may bear against the inner walls of the sleeve or against the surface of the spindle, that is, they have a diameter greater than the thickness of the spacer rings, but sufficient play is provided to enable them to assume a slightly inclined position when the roller cage is subjected to a torsional stress.

The sleeve 12 is surrounded by a yielding bowl-balancing spring 24, such as covered by Patent No. 1,158,726, dated November 2, 1915, such spring bearing against the walls of the casing opening in the usual manner.

In operation the side thrust of the separator spindle which is developed particularly before the attainment of the full speed at which separation is effected is resisted by the upper bearing, the yielding of the spring 24 serving to minimize the oscillation and gyration of the separator bowl, but more particularly this restraining of the lateral movements of the top heavy spindle is performed without imposing a material resistance to the acceleration of the spindle rotation. A centrifugal separator bowl is operated at such a high speed that it is self sustaining on the principle of the ordinary spinning top, and the gear ratio between the driving mechanism and the spindle is so great that the least friction on the spindle will constitute a material resistance to the operation of the driving means to delay or prevent the attainment of the operating speed. With the present invention the friction on the spindle is not only reduced by the presence of rollers between the spindle and the bearing sleeve, but the ability of said rollers to assume an inclined position further reduces friction by relieving end thrust of the roller cage against the sleeve. The upper spacer ring 23 being supported only by the ends of the rollers which loosely fit therein may more readily follow the rotating spindle than the lower spacer ring 30 on account of the latter resting on the flange 13. Consequently the upper ends of the rollers will lean slightly in the direction of rotation, of the spindle as permitted by their loose fit in the sockets of both spacer rings, and though this inclination is in a direction to cause the rollers to tend to creep downwardly on the bearing surface of the sleeve it is also in the direction to cause the rollers to tend to creep upwardly on the spindle, and as the roller cage is contracted to more closely fit around the spindle by reason of the torsional twist or distortion of the roller cage incident to such inclination of the rollers, the tendency of the rollers to creep upwardly on the spindle is greater than the tendency to creep downwardly on the sleeve surface, and thus the end thrust of the roller cage against the sleeve flange is reduced to a minimum.

What we claim as new and desire to secure by Letters Patent is:

1. In an upper bearing for centrifugal separator spindles, a suitably mounted sleeve for surrounding the spindle, a series of rollers adapted to bear against the spindle and the wall of the sleeve, and upper and lower spacer rings for spacing the rollers apart while permitting them to assume an inclined position with relation to the axis of the spindle, there being means for retarding the movement of one of the spacer rings.

2. An upper bearing for centrifugal separator spindles, comprising a yieldably mounted flanged sleeve for surrounding the spindle, a spacer ring within the sleeve resting on the flange thereof and provided with sockets in its upper part, rollers standing on end within the sockets of said spacer ring and having a diameter greater than the thickness of the spacer ring to bear against the inner wall of the sleeve and against the spindle respectively, and a second spacer ring supported solely by the upper ends of the rollers by having sockets in its lower part loosely fitting on the ends of the rollers for holding the rollers parallel with each other but permitting an inclination of the rollers with respect to the axis of the spindle.

3. In an upper bearing for centrifugal separator spindles, a suitably supported sleeve for surrounding the spindle, a series of vertical rollers to bear against the spindle and the walls of the sleeve respectively, and upper and lower spacer rings for holding the rollers apart, one of the spacer rings having a bearing on the sleeve to retard its movement and thereby cause the rollers to assume an inclined position.

4. In an upper bearing for centrifugal separator spindles, a sleeve for surrounding the spindle, rollers to bear against the spindle and the walls of the sleeve, and independent spacer rings at the ends of the rollers for spacing the rollers apart, there being means for retarding one spacer ring to incline the rollers and contract them around the spindle.

5. An upper bearing for centrifugal separator spindles, comprising a yieldably mounted sleeve for surrounding the spindle, vertical rollers therein to bear against the spindle and the walls of the sleeve respectively, an internal flange at the lower end of the sleeve, a lower spacer ring resting on the flange and provided with sockets in its upper part in which the lower ends of the rollers are loosely seated, a similar spacer ring with its sockets in its lower part and loosely fitting on the upper ends of the rollers, and a retaining ring fitting in the upper end of the sleeve.

6. An upper bearing for centrifugal separator spindles, comprising a yieldably mounted sleeve for surrounding the spindle, vertical rollers therein to bear against the spindle and the walls of the sleeve respectively and having spherically rounded ends, an internal flange at the lower end of the sleeve, a lower spacer ring resting on the flange and provided with sockets in its upper part in which the lower ends of the rollers are loosely seated, said sockets having conically recessed bottoms forming lubricant pockets, a similar spacer ring with its sockets in its lower part loosely fitting on the upper ends of the rollers, and a retaining ring fitting in the upper end of the sleeve.

In testimony whereof, we affix our signatures, in presence of two witnesses.

GEORGE W. HOFMANN.
WILLIAM R. MURAY.

Witnesses:
A. GEORGE JAKE,
NETTIE F. DOPKE.